June 14, 1932. M. WILDERMAN 1,862,645
PROCESS OF PRODUCTION OF SEPARATORS, DIAPHRAGMS, FILTERS, AND
THE LIKE CONSISTING OF POROUS AS WELL AS POROUS AND
NONPOROUS EBONITE AND THE LIKE
Filed Jan. 23, 1929 6 Sheets-Sheet 1

June 14, 1932.   M. WILDERMAN   1,862,645
PROCESS OF PRODUCTION OF SEPARATORS, DIAPHRAGMS, FILTERS, AND
THE LIKE CONSISTING OF POROUS AS WELL AS POROUS AND
NONPOROUS EBONITE AND THE LIKE
Filed Jan. 23, 1929    6 Sheets-Sheet 5

Patented June 14, 1932

1,862,645

UNITED STATES PATENT OFFICE

MEYER WILDERMAN, OF HAMPSTEAD, LONDON, ENGLAND, ASSIGNOR, BY MESNE ASSIGNMENTS, TO THE AMERICAN WILDERMAN POROUS EBONITE COMPANY, INC., OF PHILADELPHIA, PENNSYLVANIA, A CORPORATION OF PENNSYLVANIA

PROCESS OF PRODUCTION OF SEPARATORS, DIAPHRAGMS, FILTERS, AND THE LIKE CONSISTING OF POROUS AS WELL AS POROUS AND NONPOROUS EBONITE AND THE LIKE

Application filed January 23, 1929, Serial No. 334,447, and in Great Britain December 20, 1928.

In the manufacture of certain articles of porous ebonite in accordance with my United States Patent No. 1,651,567, dated December 6, 1927, it is often necessary to produce large numbers in as short a time as possible. For this purpose a large number of molds is required and if these were made of steel their cost would be prohibitive. In order to overcome this difficulty and to facilitate the manufacture of porous ebonite bodies in other ways, I have invented the process herein described.

Instead of using numerous steel molds which are costly and difficult to make and which may be later destroyed in the vulcanizer, thin foils made of metal or alloy or any suitable substance, are pressed to the shape and form of the two halves of a suitable steel mold, devised to produce one or more articles simultaneously.

In general the article to be manufactured is made by spreading the desired amount of powdered partially vulcanized ebonite mixture of any desired composition in one of these preformed sheets of metal foil which is placed in the corresponding half of the steel mold. After the powder has been spread it is covered with a second preformed sheet of foil corresponding to the second half of the steel mold. The two sheets of foil with the powder between them are then compressed between the two halves of the steel mold, thus causing the compressed powder to assume the shape of the mold. These sheets of foil are made to adhere by suitable means, which will be hereinafter disclosed. The double sheet of foil containing the article is then removed from the steel mold, placed between the plates of a suitable vulcanizing press and heated to the temperature necessary to complete the vulcanization and yield a strong porous body. The plates of the vulcanizing press are the negatives of the double sheet of foil and prevent the latter from changing its shape and form during vulcanization.

By powdered partially vulcanized ebonite mixture I mean powder which has been prepared from any partially vulcanized rubber-ebonite mixture, or powdered fully vulcanized rubber-ebonite covered with a layer of semi-vulcanized rubber-ebonite, and by "the like" I mean other powders in general whose particles have the property of uniting with one another under the action of heat.

By way of example I shall describe the manufacture of separators for storage batteries, such as are illustrated in Figs. 1-4.

Figure 1:
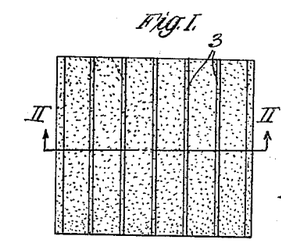
Fig. 1 is a plan view of a separator consisting of porous ebonite only.
Figure 2:
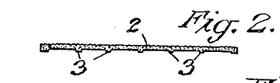
Fig. 2 is a cross-section on line II—II of Fig. 1.

The separator shown in Figs. 1 and 2 is corrugated on one side as shown at 2, and on the other has several projecting ribs—3, which act as spacers for the electrodes in the battery.

Figures 3, 4:
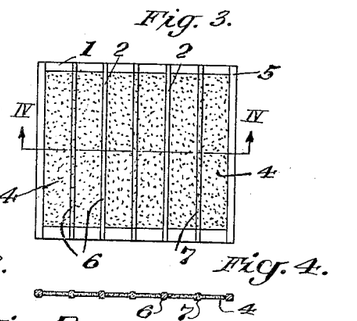
Fig. 3 is a plan view of a separator having porous ebonite fields within a frame of solid ebonite.
Fig. 4 is a cross-section on line IV—IV of Fig. 3.

The separator shown in Figs. 3 and 4 has porous ebonite fields—4, surrounded by a solid ebonite frame 5. The porous parts are further supported by the solid strips—6 and also have projecting ribs—7, which are porous.

The steel molds used for preforming the sheets of foil and for compressing the powder are shown in Figs. 5—10.

Figures 14 and 15 illustrate an assembly of the press and spreaders, Figure 14 being a side elevation of the upper part of the press showing the spreaders in position, and Figure 15 an end elevation.

Figure 15^b is a side elevation of the cam rails for controlling the spreaders;

The same numbers refer to the same or corresponding parts in all figures.

Figures 5, 6:
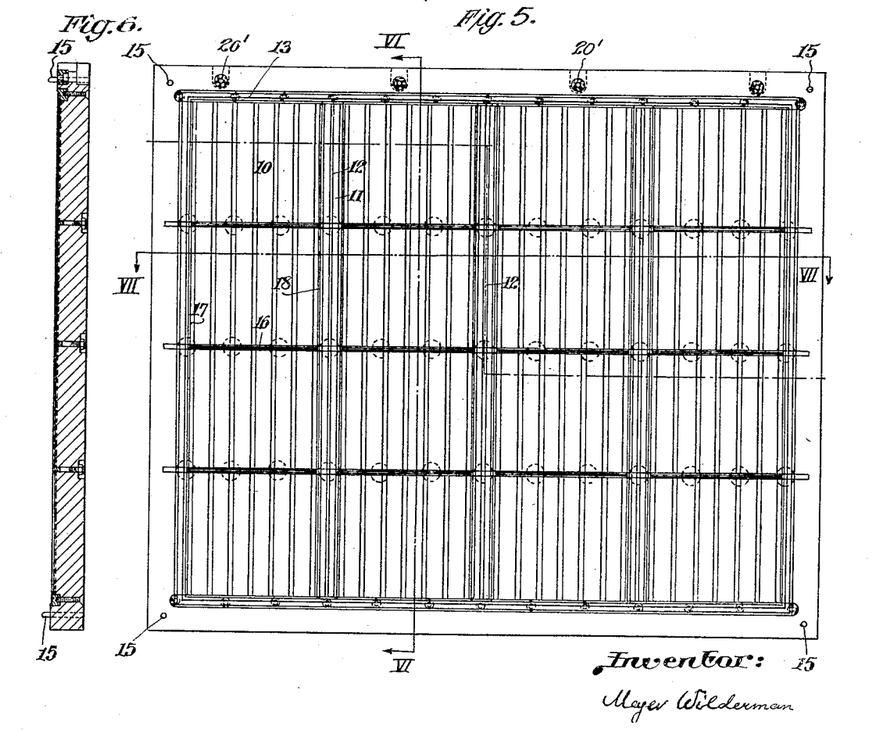
Fig. 5 is a top plan view of the lower half of the steel mold.
Fig. 6 is a cross-section on line VI—VI of Fig. 5.
Figure 7:
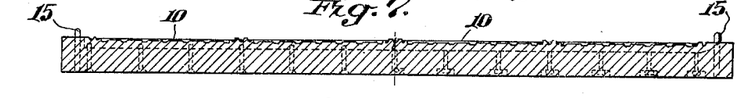
Fig. 7 is a cross-section on line VII—VII of Fig. 5.
Figures 8, 9, 10:
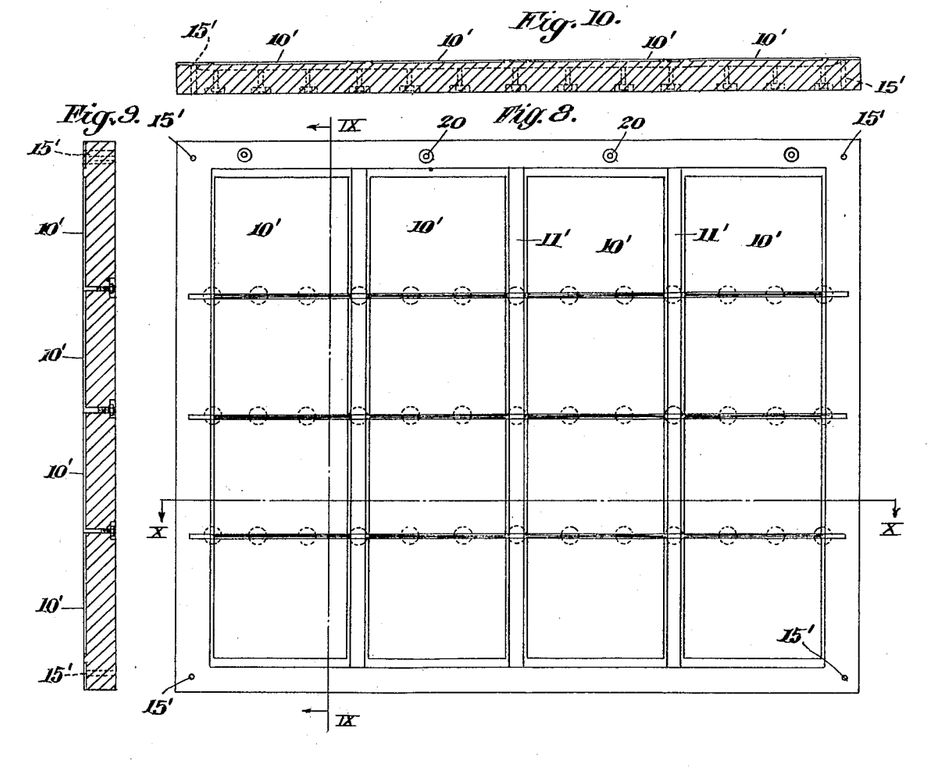
Fig. 8 is a bottom plan view of the upper half of the steel mold.
Fig. 9 is a cross-section on line IX—IX of Fig. 8.
Fig. 10 is a cross-section on line X—X of Fig. 8.

Each part of the mold, Figs. 5 and 8, has four vertical rows of cavities, 10 and 10' respectively, each row consisting of four cavities in which the separators are formed.

Between the four vertical rows free spaces 11 and 11' (Figs. 5 and 8 respectively) are left. In the lower half (Fig. 5), there are narrow grooves 12 in these spaces. Similarly, there is a narrow groove 13 in the outer rim of the mold which completely surrounds all cavities. On the contrary there are no such grooves in the upper half of the mold illustrated in Fig. 8. These grooves make corresponding ones in the lower sheet of foil and in these grooves strips of unvulcanized ebonite mixture are placed before compression of the powder. These strips act as an adhesive to hold the two sheets of foil together after compression. In each cavity there is a number of grooves 14 which correspond to the ribs 3 on the separator. The two parts of the mold are kept in registration by pins 15 fixed in the outer rim of the lower half of the mold, which fit into corresponding pin holes 15' in the upper half of the mold.

Each cavity in the lower half of the mold (Fig. 5) is surrounded by thin horizontal and vertical projecting ribs 16, 17 and 18 for the purpose of determining the size of the separator and for pressing the partially vulcanized rubber-ebonite powder to a thin rim of solid ebonite, which strengthens the separators and allows them to be removed singly from the mold.

The upper half of the steel mold (Fig. 8) is equipped with four pins 20, which fit into holes 20' in the lower half (Fig. 5). These pins act as punches to make corresponding holes in the two sheets of foil. These holes are for the purpose of hanging the double sheet of foil on corresponding pins in the vulcanizing press as hereinafter disclosed.

The sheets of foil are preformed by simultaneously pressing two of them, one place between the upper half of the steel mold and a template and the other between the latter and the lower half. This template corresponds in shape to the two halves of the steel mold and the simplest and most exact method for producing it is the following:—

A metal sheet covered with an ebonite mixture of suitable composition is placed between two sheets of foil and the whole between the two halves of the steel mold, the foil being of the same thickness as that of the foil to be pressed and used subsequently in the process. The whole is then compressed and heated to the desired temperature until the ebonite mixture is properly vulcanized.

Figures 11, 13:
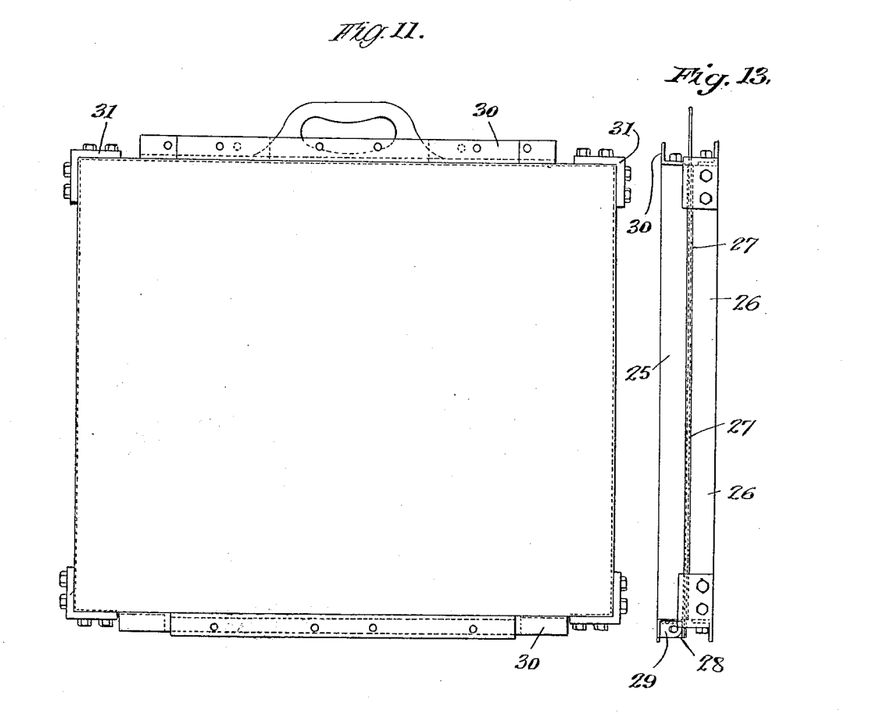
Figures 11, 12 and 13 illustrate the assembly of mold and template, Figure 11 being a top plan view, Figure 12 an end elevation, and Figure 13 a side elevation.
Figure 12:
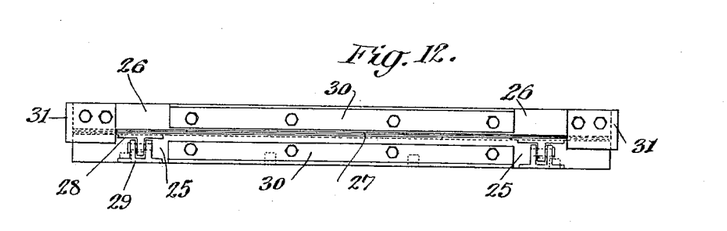

In Figures 11, 12 and 13, reference numeral 25 indicates the bottom part and 26 the top part of the steel mold. 27 is the template; 28 the hinge plate fixed to the template, and 29 the hinge pin bearing fixed to the lower part of the mold. 30 shows angle irons for fastening the top and bottom parts of the steel mold to the top of the press and to the movable table respectively and 31 indicates the corner guides fixed to the top part of the mold for keeping the two parts of the mold and the template in registration during compression.

The process is carried out as follows:

The lower part of the steel mold (Fig. 5) is fixed to the movable table of a press, while the top part of the steel mold (Fig. 8) is fixed to the head piece. The manner of bringing the lower part of the steel mold under the top part can be varied, as can also the kind of press. The compression may be arranged either by raising the lower part of the steel mold to the top part, or vice versa. On the lower part of the mold the lower preformed foil, having the corresponding shape, is placed. The table is heated by steam, or by any other suitable means, which keeps the lower part of the steel mold and the foil in it at any desired temperature. The head piece of the press is similarly heated and thus the top part of the mold is kept hot. This is an essential condition for the success of the process and is necessary for two reasons:— first, to keep the partially vulcanized particles, which agglomerate at room temperature, in a state of fine sub-division during spreading, and second, to soften the unvulcanized strips placed in the grooves 12 and 13 (Fig. 5) sufficiently to unite the two sheets of foil and hold them in their proper relative position after removal from the press and during subsequent manipulation. In case separators having solid frames and ribs are being made, no such strips are necessary, since the material used for the frames acts as an adhesive and holds the two sheets of foil firmly together.

The next operation consists in spreading into the lower foil particles of partially vulcanized rubber-ebonite, and the like, of the requisite composition and properties, and at the proper temperature, in a state of fine sub-division from an apparatus which I call the "spreader" or "filling machine". It is essential for the success of the process that the partially vulcanized particles be herein held at the temperature which insures the particles of a given composition remaining in a state of fine sub-division when stirred. This temperature varies with the composition and state of vulcanization of the particles. In general, harder particles can be spread at lower temperatures than softer ones, and the usual range for practically all particles is between 60° and 100° C.

The particles are made from an ebonite mixture which has been vulcanized only enough to permit it to be ground to a fine powder on the rolls of a mixing mill.

The process of spreading and compressing the powder may be carried out in different ways. The spreaders, which may be mounted on a press, spread the powder while moving over the mold or the spreader may be held stationary while the molds pass under it on a conveyor and subsequently to a press where the powder is compressed between the two sheets of foil. The essential features of the process are the same in both cases.

Figure 14:
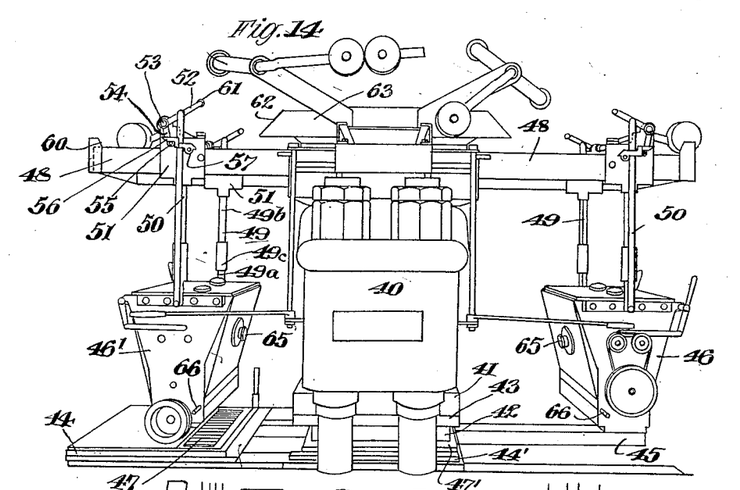
Figures 15, 15B:
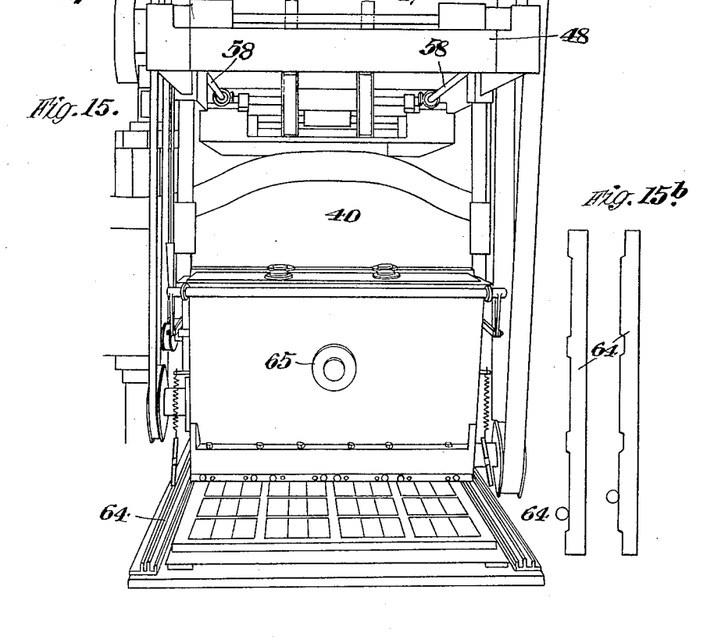

An assembly of the press and spreaders is shown in Figs. 14 and 15.

The lower part and operating mechanism of the press are omitted because it is immaterial how the two halves of the mold are brought together for compressing the powder.

In Fig. 14, 40 shows the head piece, 41 the top plate of the press through which steam of the desired temperature is conducted, 42 the top part of the steel mold fixed to the plate 43, which slides on to the plate 41. The press has two moving tables which are indicated by 44 and 44'. In Fig. 14 the table on the left is shown while the table from the right is within the press under the top part of the steel mold. On the right only the guiding and supporting framework 45, on which the table rests, and the spreader 46, are shown.

The lower halves 47 and 47' of the steel mold are fastened to the moving tables 44 and 44' respectively.

On the top of the head piece 40 of the press the framework 48 is fixed from which the spreaders 46 and 46' are suspended on the guiding telescopic suspension bars 49 and the lifting bars 50.

The guiding bar 49 consists of two parts, one 49a fixed to the spreader and the other a tubular portion 49b fixed to the carrier 51 sliding on the two side bars of the framework 48. The two parts are connected by the adjustable nut 49c, the bar 49a rising and falling within the tubular portion 49b with the rise and fall of the spreader.

The lifting bars 50 consist of rods on each side of the spreader fixed to the latter and suspended on two rocking levers 52 which are pivoted at 53 on the projecting part of the carriers 51. The lever 52 has on its lower arm 54 a roller 55, the shaft of which projects beyond the roller and acts as a catch-pin for the catch-lever 56 pivoted at 57. The function of the lever 52, and of the catch-lever 56 is to raise the spreader after the spreading operation is finished and to hold it at that level while the screws 58 draw it back to its starting position near the press. This operation is as follows:—When the spreading is finished the spreader continues its forward motion to the left, as viewed in Fig. 14, until the rollers 55 engage the stop-plates 60 fixed on the frame 48. The motion of the spreaders causes the rocking levers 52 to rotate about the pivots 53, thus lifting the spreader by means of the lifting bars 50. The catch-pin on the shaft of the roller 55 then engages the catch-lever 56 and thus as the spreader moves backward prevents it from falling to the lower level necessary for spreading. When the spreader is drawn back to its starting position near the press the rollers 61 run onto the surface 62 of the cam plate 63 raising the spreaders slightly and releasing the catch-levers. These are then held by springs, not shown, so that when the spreaders are started forward again they do not engage the catch-pins and thus the spreader is allowed to drop to the spreading position on the rails 64.

65 indicates a switch on each side of the spreader which regulates the temperature of the powder by varying an electrical resistance arranged between the double walls of the spreader. 66 indicates a connection for circulating water of any desired temperature through the lower part of the spreader for regulating its temperature under any atmospheric conditions. Two of the rails 64 are cam type, as shown in Fig. 15b. The plain rail is for fixing the distance of the spreader from the foil and the two cam type rails for controlling the operation of the shutter for the slots of the spreader and of blades on the under side for pressing the foil firmly in the mold during spreading. Other cam type arrangements using rotary cams in conjunction with the movable table could be used.

The spreader and press operate as follows:—

The starting position of the spreader is close to the head piece of the press. In this position the rollers 61 rest on the top surface of the cam plates 63, and by means of the rocking levers 52, and the lifting bars 50, hold the spreader in its highest position. When it is desired to spread the powder the screws 58 are started. These screws are driven by any desired means, such as a belt or direct-connected electric motor. As the spreader moves forward the rollers 61 move down the surface 62 of the cam plate 63, lowering the spreader until it rests on the rails 64. The forward motion of the spreader continues and when the slots in the under side are over the edge of the mold cavity in which the powder is to be spread the shutter is opened by means of a lever running on one of the cam type rails. At the same time the blades which press the foil into the mold are released by a lever running on the other cam type rail. The spreader then moves forward, spreading the powder, until the last edge of the last cavity is reached, when the shutter is closed and the blades are raised from the foil. The spreader continues its forward motion until the rollers 55 on the rocking lever 52 engage the stop-plates 60. The rocking lever then rotates about its pivot 53, raising the spreader until the catch-levers 56 drop over the shaft of the rollers 55. The forward motion of the spreader is automatically arrested at this point. The driving screws 58 are now reversed and the spreader moves back to its starting position preferably at a speed greater than that of the forward motion. When the spreader reaches this point the catch-levers 56 are automatically raised and held so that when the forward motion is again started the spreader can drop to the spreading position on the rails.

The powder in the mold is now covered with the second sheet of foil and the whole drawn under the head piece of the press and compressed. After compression the lower half of the mold is withdrawn from the press, the double foil removed and the operation repeated.

Other arrangements of the same machine may also be made within the scope of the present invention. Instead of having stationary molds and a moving spreader the spreader may be held in one position while the molds are passed under it at the proper speed for correct spreading of the powder. The molds may be carried on a suitable conveyor which passes through the press, stopping automatically while the powder between the two sheets of foil is compressed. This conveyor may move intermittently in the same direction or it may have a reciprocating motion to return the mold to the spreading position under the spreader. Several lower halves of the steel mold may be linked together to form a continuous chain which passes under the spreader and into the press, the powder being spread on one side of the press and the compressed powder within the foil removed from the steel mold on the opposite side. In all such cases the spreader operates as described above, its rising and falling and the operations of the shutter being synchronized with the movement of the molds. The press would then be operated automatically, closing only when the lower half of the steel mold containing the powder between two sheets of foil had reached the proper position below the upper half of the steel mold.

The vulcanization of the article is completed by heating the powder in the double sheet of tin foil between the plates of the vulcanizing press.

This press and the backing plates are shown in Figs. 16, 17, 18, 19, 20.

Figure 16:
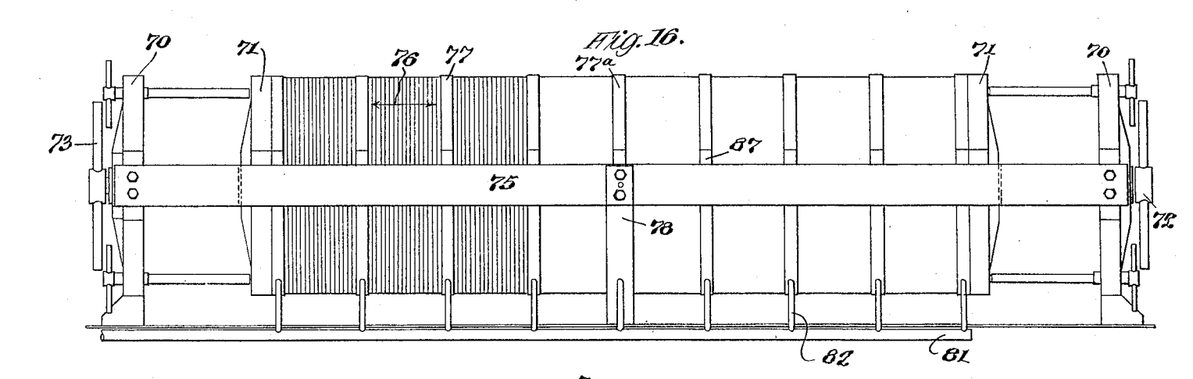
Figure 16 is a side elevation of a vulcanizing press.
Figure 17:
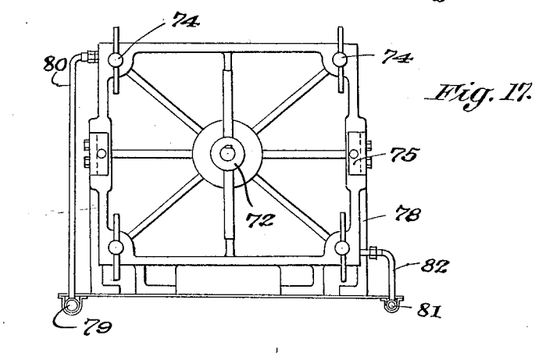
Figure 17 is an end elevation of the press.

In Figs. 16 and 17, 70 shows the end plates, 71 the compression plates which are moved by the central screw 72. 73 is the handle of this screw. 74 shows corner screws to maintain a more even pressure over the entire surface of the compression plate. 75 is the side column which holds the ends of the press together and on which the backing plates 76 and the heating plates 77 are carried. 78 is a supporting column for the side columns and for the central heating plate 77a. 79 is the inlet header for steam which is connected by pipes 80 to the heating plates. 81 is the exhaust header connected to the heating plates by pipes 82.

Figures 18, 19, 20:
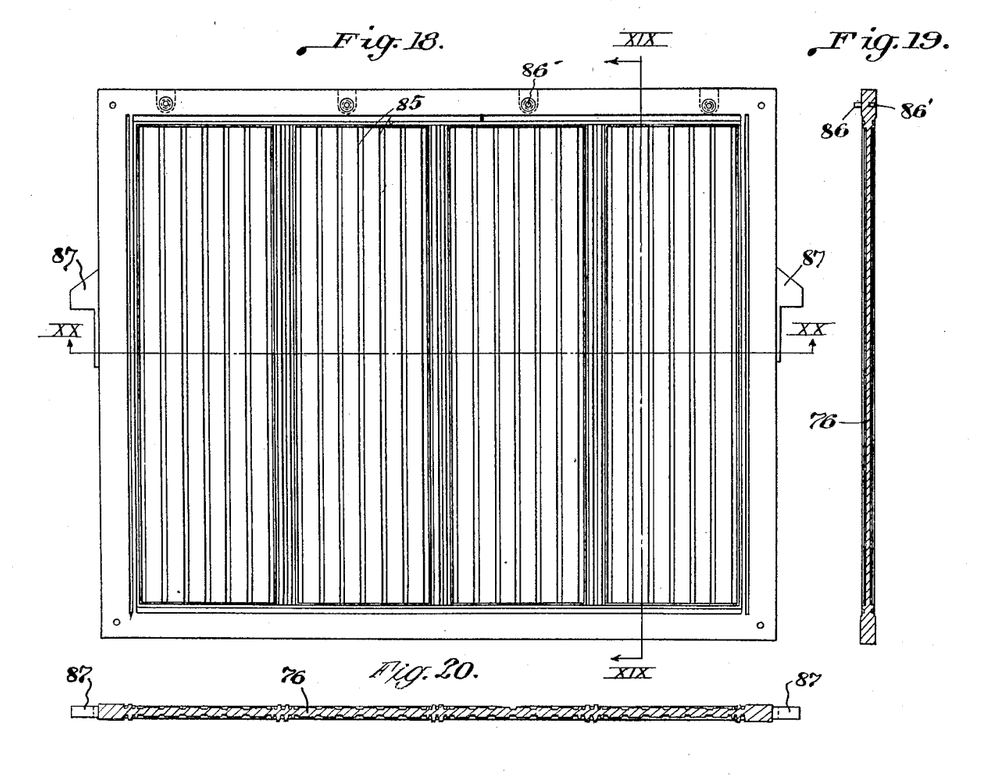
Figure 18 is a plan view of one of the backing plates used in the press.
Figure 19 is a vertical section on the line IX—IX of Figure 18.
Figure 20 is a horizontal section on the line XX—XX of Figure 18.

Figs. 18, 19, and 20 show a backing plate 76 for use with the foils in the vulcanizing press. In these figures 85 are grooves which correspond to the ribs on the tin foil mold, 86 are pins which correspond to the holes 20' punched in the tin foil mold and on which the latter are hung during vulcanization. 86' indicates holes in the opposite side of the backing plate into which the pins 86 on the adjacent plate fit, thus permitting the plates to be brought into close contact with the tin foil molds. 87 are lugs which rest on the side columns of the press and carry the weight of the backing plates.

The backing plates are best made by casting them in a suitable steel mold preferably from some soft alloy such as a lead-antimony alloy of about 10–12 percent antimony content. In order to strengthen and stiffen the casting a sheet of steel, perforated so as to insure good adhesion is used as a core. This core carries the lugs 87 and the pins 86.

The vulcanization is carried out as follows:—

The double sheet of foil containing the partially vulcanized powder is hung between the backing plates 76 on the vulcanizing press on the pins 86. When all double sheets are in place the press is closed and screwed up tight by means of the screws 72 and 74 (Figs. 16 and 17). The press is then placed in a jacketed vulcanizer, the inlet pipe 79 is connected to the steam supply and the exhaust pipe 81 to the drain. Steam is admitted to the jacket and to the heating plates 77 (Fig. 16). No steam is permitted in the interior of the vulcanizer since moisture would then come in contact with the powdered partially vulcanized ebonite mixture and result in a weak product.

After the vulcanization is completed cold water is passed through the plates 77 (Fig. 16) and a spray of cold water allowed to fall on the vulcanizing press for the purpose of cooling the molds as rapidly as possible.

The double sheets of foil are now removed from the vulcanizing press and the separators or other porous ebonite articles are taken out of the foil mold. The sheets of foil can then be cleaned and used again. In case they are deformed they can be re-pressed between the mold and the template in order to give them their proper shape.

Having now particularly described and ascertained the nature of my said invention and in what manner the same is to be performed I declare that what I claim is:—

1. The process of manufacturing porous ebonite bodies and the like, comprising introducing partially vulcanized particles between foils while maintaining the particles at elevated temperature at which they remain in a state of fine sub-division, compressing the particles while between the foils to form a porous body, and heating the compressed body to complete the vulcanization.

2. The process of manufacturing porous ebonite bodies and the like, comprising introducing partially vulcanized particles between foils while maintaining the particles at a temperature substantially between 60° and 100° C., whereby the particles remain in a state of fine sub-division during introduction thereof between the foils, compressing the particles while between the foils to form porous bodies, and heating the compressed body to complete the vulcanization.

3. The process of manufacturing porous ebonite bodies and the like, comprising spreading partially vulcanized particles between sheets of foil and within a frame of non-porous unvulcanized rubber mixture, compressing the partially vulcanized particles between the foils to form a porous body and cause the frame to hold the foils securely after compression, and heating the compressed body while between the foils to complete the vulcanization.

4. The process of manufacturing porous ebonite bodies and the like, comprising introducing partially vulcanized particles between foils while maintaining the particles agitated and at elevated temperature at which they remain in a state of fine subdivision, compressing the particles while between the foils to form a porous body, and heating the compressed body to complete the vulcanization.

In testimony whereof I affix my signature.

MEYER WILDERMAN.